United States Patent [19]

Bossard et al.

[11] Patent Number: 5,052,775
[45] Date of Patent: Oct. 1, 1991

[54] OPTICAL FIBER MODULE TERMINATION ARRAY AND PANEL

[75] Inventors: Ronald G. Bossard; Roger H. Keith, both of St. Paul, Minn.

[73] Assignee: Minnesota mining and Manufacturing Company, St. Paul, Minn.

[21] Appl. No.: 394,138

[22] Filed: Aug. 15, 1989

[51] Int. Cl.⁵ .................................................. G02B 6/26
[52] U.S. Cl. ......................................... 385/76; 385/95; 385/135
[58] Field of Search ............... 350/96.20, 96.21, 96.22

[56] References Cited

U.S. PATENT DOCUMENTS

| | | | |
|---|---|---|---|
| 3,989,567 | 11/1976 | Tardy | 156/158 |
| 4,050,783 | 9/1977 | Tardy | 350/96 C |
| 4,585,303 | 4/1986 | Pinsard | 350/96.20 |
| 4,684,210 | 8/1987 | Matsunaga et al. | 350/96.20 |
| 4,752,110 | 6/1988 | Blanchet et al. | 350/96.20 |
| 4,770,357 | 9/1988 | Sander et al. | 350/96.21 X |
| 4,824,196 | 4/1989 | Bylander | 350/96.22 |

FOREIGN PATENT DOCUMENTS 0101970 8/1983 European Pat. Off. .

Primary Examiner—William L. Sikes
Assistant Examiner—Phan T. Heartney
Attorney, Agent, or Firm—Donald M. Sell; Walter N. Kirn; John C. Barnes

[57] ABSTRACT

An optical fiber termination module for use in terminating having an end wall and a splice magazine, a connector supported on said end wall, one plug of which has a short optical fiber extending therefrom straight to a splice supported in the magazine, and the support having a fulcrum to afford tilting of the support intermediate its ends to afford movement of the end wall to a position away from the end wall of other modules to allow easy access to the connector for attaching a distribution plug.

23 Claims, 3 Drawing Sheets

OPTICAL FIBER MODULE TERMINATION ARRAY AND PANEL

BACKGROUND OF THE INVENTION

1. Field of the Invention

The present invention relates to an optical fiber termination module for use in an array of modules for terminating the optical fibers of a cable, and in one aspect to an optical fiber module for use in a panel with an array of modules to be connected to optical fiber distribution lines.

2. Description of the Prior Art

The prior art has a variety of panel configurations for connecting the optical fibers in an incoming cable to the connectors and managing the slack cables and splice structures incorporated in the panels. One such patent of the assignee of this application is U.S. Pat. No. 4,824,196.

The present invention is directed at a simplified version of supporting a plurality of termination modules in an array and packaging the array of modules for use in terminating a small number of optical fibers, such as in an apartment building or in a single family residence, or in a factory or office work station. The prior art panels in some instances may be modular to afford their use with a small number of fibers but by and large they are adapted to the large termination situations where many optical fibers are terminated. In the present environment it is necessary that the distribution fiber be capable of being connected and disconnected without calling a technician. Yet there are only a small number of fibers and they therefore should be conveniently packaged to permit one of limited assembly skill to make the connections and disconnections of the distribution fibers from the transmission lines coming into the residence or work station. A skilled technician will generally make the splice between the incoming fiber and the panel connector and then one with minimal assembly skill can make the connection to the panel connector. The splice to the pigtail of a connector plug is made by a device which can be applied by a skilled technician in the field, who cleaves the fiber, abuts two fiber ends and joins the ends together permanently by a splice. The connector includes connector plugs, a coupling and connector plug which plugs are applied to a length of optical fiber which is carefully prepared and aligned in a fixed position in the plug of the connector in an assembly plant or as a field operation requiring special equipment and great care to terminate the fiber precisely. This plug and fiber end may then be readily connected to the end of another fiber which is terminated in a connector plug in a connector coupling which mates and aligns the ends of the fibers in the plugs to each other. This can be accomplished by anyone with minimal assembly skills. The skilled technicians then are the workers with the responsibility of taking the optical fiber cable that has arrived at the termination station and separating the individual optical fibers and then splicing them to a fiber end leading from a connector plug. The plugs are subsequently connected to a connector coupling for connection to a plug on a fiber running to an opto-electronic piece of equipment. When this piece of equipment is a piece of equipment in the home, apartment or factory or office work station and the number of optical fibers are all contained in a single cable, or the cable contains optical fibers together with copper signal wires, it is desirable to have a convenient means of termination of the optical fibers as well as a convenient method of joining the copper wires to a distribution wire. This type of termination should not require any more skill than the technician that would routinely service and install telephone or electrical power. If it requires tools that cut and polish the optical fiber end and special fixtures to secure the finished fiber end in a plug, then the level of skill required to make only several connections at remote locations is economically and commercially disadvantaged, and the optical fiber distribution system will not grow and be as readily available to as many citizens as rapidly as desired.

Presently, where large installations are made in a building or central station, a distribution housing is installed and the cable is brought in for distribution. Individual optical fibers from the cable are spliced to long pigtails, each consisting of individually jacketed optical fiber terminated into a connector plug at one end. The pigtail connector plug is mounted into a connector coupling located within the distribution housing or a remote second distribution housing. The splice joining the two fibers is placed within a splice holder within the first distribution housing. The surplus fiber from the pigtail and surplus fiber from the cable are both carefully stored in the distribution housing. A second plug mates with the first plug in the connector coupling and routes to an opto-electronic device or other intermediate junction. This is the routine which must be followed to allow slack for removal of the fiber from the distribution housing for application of a plug, either as a precise field cut and polish operation or through splicing of a factory made plug with a fiber pigtail.

A prior device, identified as an optical cable header is described in U.S. Pat. No. 4,585,303. This device utilizes a plurality of optical connector supports which are engaged in a magazine or housing. The connector supports have an elongate body in the form of a hollow finger. The finger has a cylindrical connector member at a front end and a side mounted former upon which to wind a length of fiber located near to its opposite or rear end. The magazine has a row of cavities which are open at the rear of the magazine for receiving the supports and have circular openings in the front wall to receive the connector members on the connector supports when they are received in the cavities. In FIGS. 7-11 the optical connector support includes a finger, constituted by a rigid metal blade formed of elongate U shape. The optical connector is mounted in the bottom of the U to receive the end fitting of a fiber inside the finger. The optical connector will also receive an analogous end fitting of an external fiber for connection to the fiber inside the finger. The connector described in the introduction is an installed connection end fitting, for example the one described in French patent 2 275 787 and patent of addition 2 316 611, the earliest patent corresponding generally to U.S. Pat. Nos. 3,989,567 and 4,050,783. This connector is designed to receive one or multiple fibers, but to receive one fiber, requires an installation and in each end fitting, the end face of a fiber is rectified and suitably positioned for providing accurate optical connection when two connection fittings are brought together. The installation of the end fitting is not perceived as a field installation since U.S. Pat. No. 4,585,303 refers to the cable having a plurality of optical fibers with each fiber having a connection end fitting installed on its end. The purpose of the patented header is to avoid having to interrupt the connection of several fibers as with the connector of U.S. Pat. No. 4,050,783, when repairing a defect in the connection between any one pair of fibers. Further, after the supports are placed in the magazine, the connector members on the front face of the magazine are aligned in a row and are not readily accessible to make the desired connections.

Another mounting panel with means for supporting a plurality of connectors is shown in U.S. Pat. No. 4,752,110. This patent shows a cabinet for supporting incoming fibers, slack in those fibers, splices, connectors and pigtail fibers, and the plugs for the distribution fibers. This is typical of the prior art and is too bulky and unnecessarily complicated to provide the termination in the residence, apartment or at the work station.

The purpose of the present invention is to provide a module which allows splicing of a fiber to a connector plug pigtail within the module, thus eliminating the need for excess slack between the splice and plug, and between the splice and the balance of the feeder system as formerly required to remove the splice to a location suitable for the precise operation required.

Reliable mechanical splices of several designs have recently become available which make this splicing within the module possible.

It is therefore an object of this invention to provide a termination which will reduce the need for large or bulky boxes to handle incoming and connector fibers to afford the installation of optical fibers into a residence, apartment or work station and connection of the incoming optical fibers to opto-electronic equipment.

It is a further object of the present invention to provide a module which can be coupled to the end of the incoming fiber readily in the field by the skilled technician to terminate the transmission cable. This module is then packaged in an array wherein the modules are in side-by-side relationship to fit in a compact panel, in an array with other modules, in such a manner as to afford ready access to the individual connectors for attachment of the plugs on the distribution fibers by a relatively unskilled assembler.

SUMMARY OF THE INVENTION

The present invention provides a novel optical fiber termination module for use in terminating a cabled optical fiber at a distribution panel. The module is particularly adapted to terminate the individual fibers in a cable and to provide a compact array with other modules, each being as readily accessible when required as a single module.

The module comprises a frame for supporting an optical fiber connector coupling, a single connector plug connected to one end of a length of optical fiber and joined to the coupling, an optical fiber splice having opposite open ends for making connection between a second end of the length of optical fiber and the free end of an optical fiber from a cable. The frame provides support means for supporting the coupling and the splice in substantially axial alignment. The support means comprising an end wall for supporting the connector coupling in fixed position thereon and a base joined to the end wall and extending in a direction away from the end wall. The base includes magazine means for supporting the splice in close spaced relationship to the plug with said second end of the length of optical fiber extending straight to a position in the splice. The base is provided with a fulcrum means intermediate its ends and the end opposite the end wall is formed to afford pivotal movement of the frame about the fulcrum means to raise the end wall and lift the coupling from its normal position to a position affording facile access to the coupling by the fingers of a person with minimal assembly skill to couple or uncouple a companion plug with the coupler to make or break the connection with the transmission line.

The fulcrum means permits the mounting of a plurality of the modules on a common axis. The axis for mounting the modules is formed in the bottom of a shallow tray or panel and the modules are arranged in a side-by-side array. Means is provided in the tray for storing slack fiber from the transmission line. The storage area is preferably provided with a cover to limit access thereto because after the skilled technician has made the connection to the connector plug the remaining connections are made to the coupling; and such can be made by raising the coupling from the plane of the other couplings to have free access to the coupling desired.

In a preferred embodiment the module includes a cover hinged in relationship to the base to be positioned over the splice. The cover can be provided with a pawl which will facilitate the pivoting of the module on the fulcrum and afford means to retain the module in the raised position. The tray is provided with a hinged door or sliding cover which conveniently covers the storage area of the tray to cover the slack fibers in the storage area. Access openings or pre-perforated areas for making access openings in the field for the transmission cable and for the distribution cables are provided in the side walls or base of the tray surrounding the storage area to facilitate various tray mounting arrangements.

BRIEF DESCRIPTION OF THE DRAWING

The present invention will be further described with reference to the accompanying drawing wherein.

DESCRIPTION OF THE PRESENTLY PREFERRED EMBODIMENT

Figure 1:
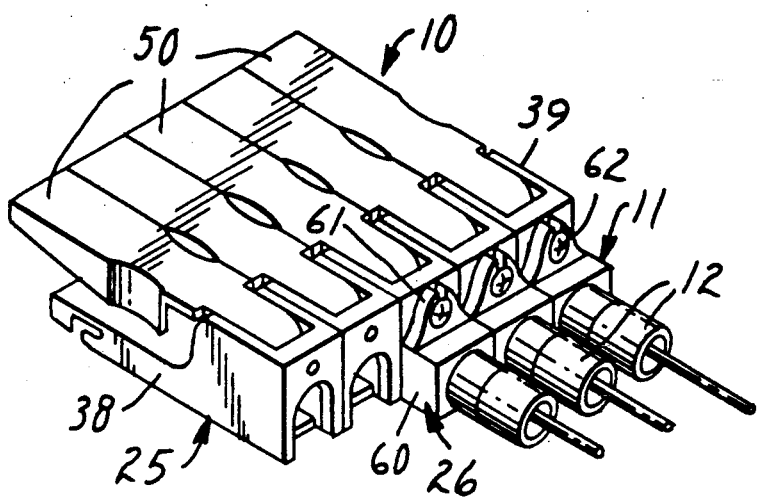
FIG. 1 is a perspective view of an array of optical fiber termination modules according to the present invention in a side-by-side array.

The optical fiber termination splice module and the array formed upon packaging of the same according to the present invention will be described with reference to the accompanying drawings wherein like parts are identified by the same reference numerals throughout the several views.

Figure 2:
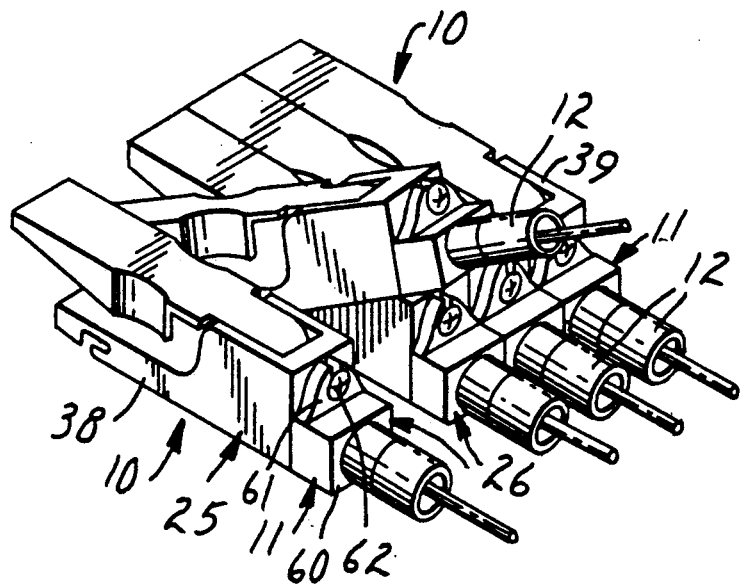
FIG. 2 is a perspective view of the module array of FIG. 1 with a single module tipped to illustrate easy access to the connector.
Figure 4:
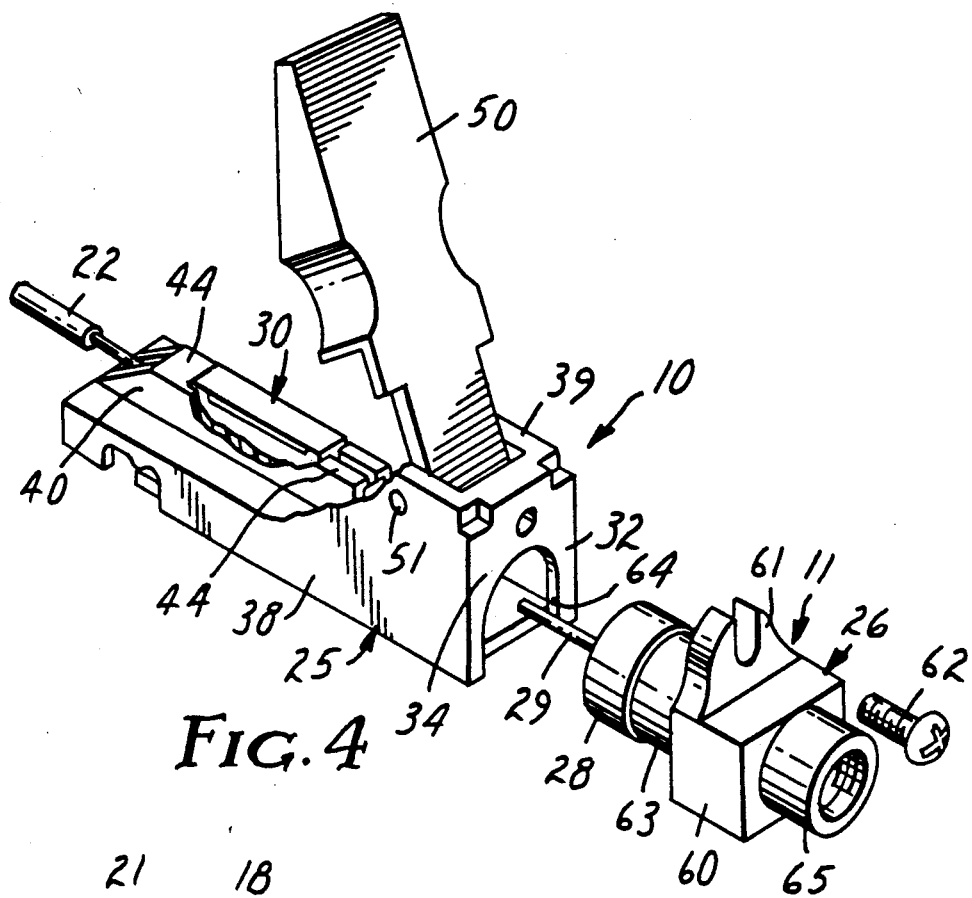
FIG. 4 is an exploded perspective view of an optical fiber termination module illustrating the several parts thereof.

When optical fiber connectors are placed in juxtaposition it is very easy for a fiber to be damaged during the coupling or uncoupling of a plug to a connector. Therefore, the present invention has as an object the provision of a termination module 10 having a connector 11 thereon which module 10 can be placed on the end of a signal conductor and placed closely adjacent another module 10 terminating a second signal conductor, but which affords the separation of the connectors to afford facile coupling and uncoupling thereto. As illustrated the closely packed modules 10 do not allow access by the fingers readily when it is desirable to couple or uncouple a plug 12 from a connector 11 when the modules are arranged in side-by-side position. The module 10 of the present invention allows the desired module to be tilted, raising the connector from the side-by-side location allowing ready access to the connector, see FIG. 2.

The array of modules 10 are preferably positioned in a panel having a tray 15 adapted for mounting in a cupboard or closet such that the modules are kept in order and conveniently, centrally located. The tray 15 is a shallow rectangular tray with a base 16 and side walls 17 which project upwardly from the base 16. One area on one end of the base is dedicated to receiving and storing a length of the optical fibers. The tray side walls 17 and/or base 16 are provided with pre-perforated areas 18 which can be removed to afford entry of the signal conductors into the storage area. Additional knock-out areas 19 afford exit openings for the distribution fibers. A plurality of ears 20 are formed in the storage area about which the conductors may be wrapped to form one or more loops. As illustrated the conductors are wrapped on ears 20 which are formed from the base and positioned to define a loop area at least twice the minimum bending radius for an optical fiber of the incoming fiber buffer tube 21. The individual fibers 22 are then directed from the loop to the individual modules 10.

The module 10 illustrated in FIGS. 4, 5, 6, and 7 comprises a small frame or support 25, the coupling 26 of the optical fiber connector 11, a single connector plug 28 connected to one end of a short length 29 of optical fiber and joined to one end of the coupling 26, an optical fiber splice 30 having opposite open ends for making connection between a second end of the length 29 of optical fiber and the free end of the optical fiber 22 from a cable 22.

The frame or support means 25 for supporting the coupling 26 and the splice 30 in rigid alignment, i.e. substantially rigid coaxial alignment, comprises an end wall 32 having four sides and two faces 33 and 34, and an opening therethrough for supporting the connector coupling 26 in fixed position thereon and a base 35. The base 35 is a narrow elongate strip molded integrally with and joined to one side of the end wall 32 and the base 35 extends in a direction away from the face 33 of the end wall 32. The frame or support means 25 also includes a pair of side walls 38 and 39, and means defining a magazine 40 for supporting the splice 30 in close spaced relationship to the end wall 32, allowing space for connection of the plug 28 into the coupling 26. The coupling and plug illustrated is a bay receptacle and a biconic plug respectively, such as manufactured by 3M Fiber Optic Products, Inc. of Eatontown, N.J. 07724.

The magazine 40 is shaped to receive the splice 30 and to hold the same in a position aligned with the plug 28 to receive, in the splice 30 at a position approximately half the length of the splice, the second or free end of the length 29 of optical fiber fixed in the plug 28. The fiber 29 extends in a substantially straight line between the plug 28 and the splice 30. The length of this fiber is between 0.5 and 12 inches (1.27 and 30.5 cm) and as illustrated, with the known mechanical splice and connector is between 1.5 and 2.5 inches (3.8 and 6.4 cm) in length. The magazine 40 has spaced wall members joined to an arcuate base defining therewith a U-shaped support, shaped to fit and to receive the splice 30 in position to permit the splicing of an incoming fiber with the length of fiber 29. The support 25 is formed of a resilient polymeric material.

In the illustrated magazine 40 a splice according to U.S. Pat. No. 4,818,055, issued Apr. 4, 1989, and sold by the assignee of this application, is placed between walls of the magazine 40 forming the U-shaped recess. The recess is closed at the top adjacent the upper edges of the walls at the ends of the support to secure the splice 30 therein and restrict displacement of the splice prior to splicing the second fiber into the module 10 since the splice is not secured to the optical fiber 29 and the splice 30 could be removed. The end walls 44 which cover upper ends of the recess restrict the splice 30 from being removed from the top of the magazine 40. The wall 44 at the end of the magazine 40 adjacent the end wall 32 is split, see FIG. 4, to allow initial entry of the splice 30 into the magazine 40 by flexing the walls of the magazine apart. The presence of the fiber 29 in the splice 30 and a stop at the rear of the magazine 40 limit movement of the splice 30 endwise. An opening in the rear of the magazine permits the entry of the optical fiber 22 to be terminated into the splice 30 positioned in the magazine 40. The axis of the metal fiber aligning element in the splice 30, the fiber 29 and the coupling 26 are not in precise axial alignment to allow the fiber 29 to flex slightly when the fiber 22 is inserted to indicate the ends of the two fibers are in contact. At this point the cover of the splice 30 can be closed to bring the fiber aligning element onto the fiber ends and fix them in aligned relationship.

In a preferred embodiment the module 10 includes a cover 50 hinged, about a pivot axis 51 extending through the side walls 38, 39 in relationship to the base 35 to be positioned over the splice 30. The splice 30 is formed with a body and a cover which is forced into the body when the splice is made. Entry of the cover into the body forces legs of the aligning element to engage and axially align the two opposed optical fiber ends. The cover 50 is provided with a projection 52 intermediate its ends which is positioned over the magazine 40 to engage the cover of the splice and force the same into the body as the cover is moved forcibly to the position over the base 35. During shipping or storage of the module 10 a dust cover may be placed over the magazine and splice to restrict closure of the cover into the splice body and dust from entering the splice. Also in the illustrated embodiment the base is provided with an inclined trailing edge as indicated at 55 and a notch 56, to be further described, is formed adjacent the inclined edge to afford means to support the module and to afford pivotal movement of the module to allow the end wall 32 to be raised above the normal plane of the base.

Figure 3:
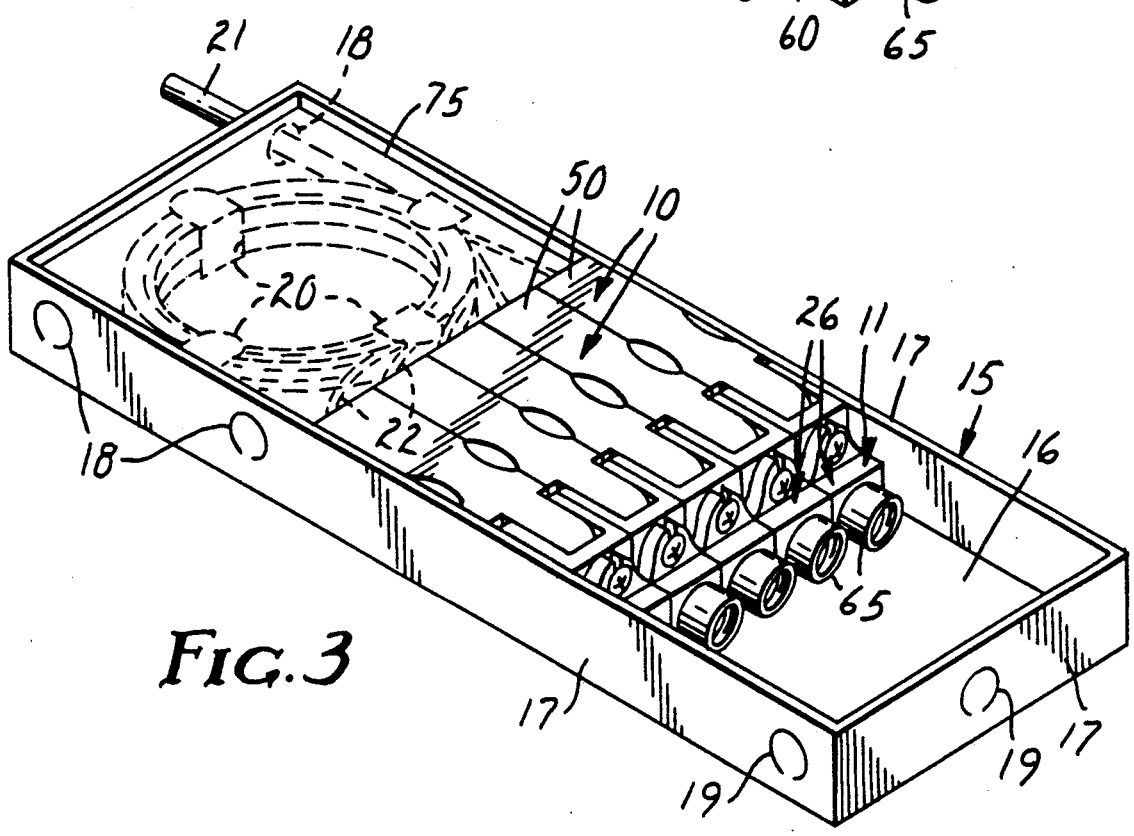
FIG. 3 is a perspective view of the array of termination modules packaged in a panel adapted to fit compactly in a cupboard or closet.
Figure 5:
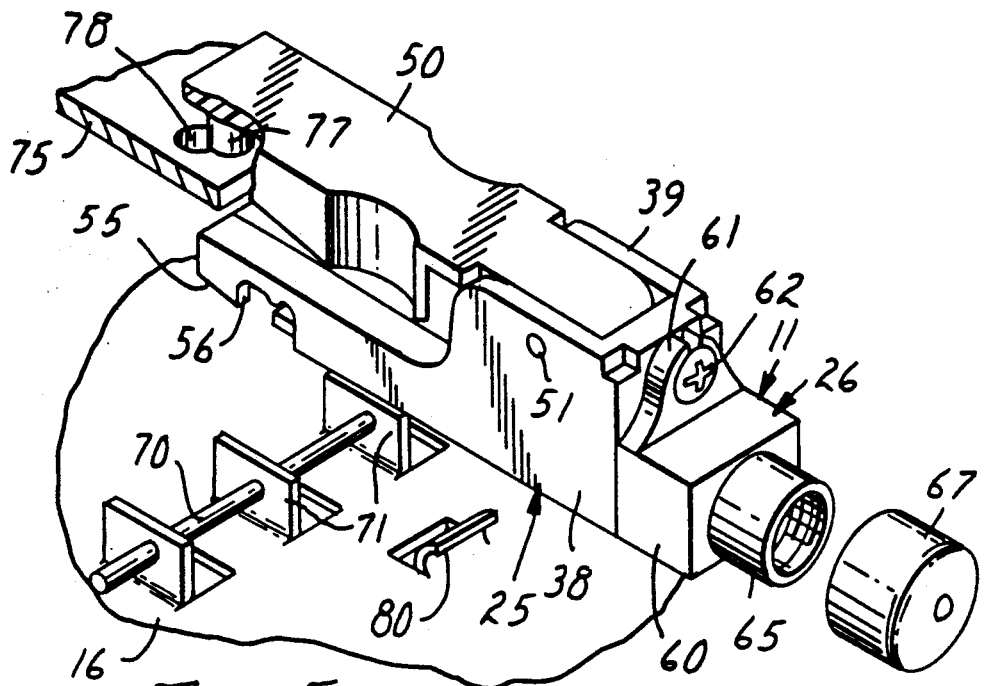
FIG. 5 is an exploded perspective view of a module positioned above the support plate of the panel to illustrate the mounting of the module.
Figure 6:
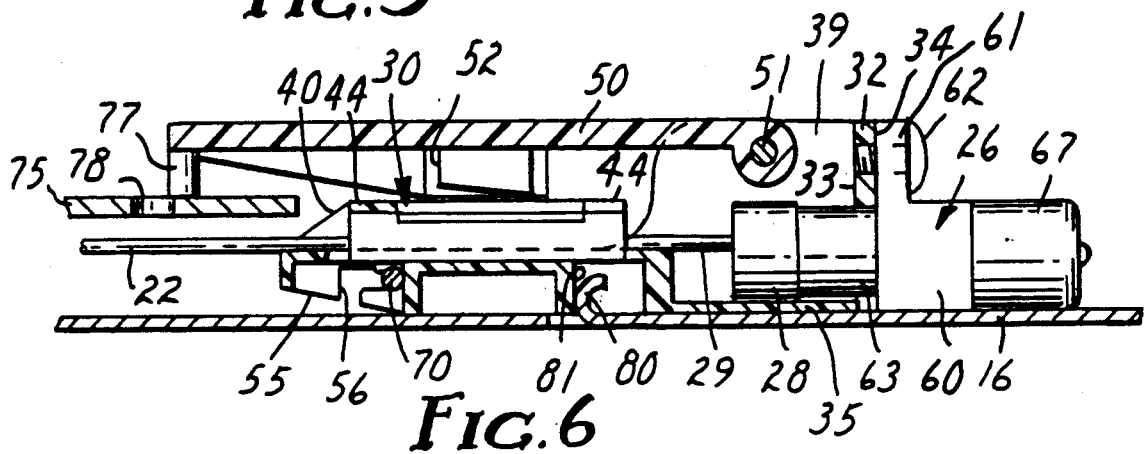
FIG. 6 is a longitudinal sectional view of a module on the support plate showing the module in the normal position.

The coupling 26 comprises a rectangular housing 60 from which extends a coplanar mounting flange 61 having a slotted aperture to receive a fastener 62 and a first cylindrical projection 63 which is internally threaded to receive the connector plug 28. The end wall 32 has an opening 64 which receives the coupling projection 63 in substantially axial alignment with splice 30 and a second opening in the end wall 32 to receive the threaded fastener 62 to suitably mount the coupling 26 to the end wall. A second cylindrical projection 65 is positioned for receiving the plug on the end a cable extending from a piece of opto-electronic equipment. A removable cap 67, illustrated in FIGS. 3, 5 and 6, is preferably placed over the projection 65 to limit dust or other material from entering the cavity of the coupling and covering the end of the fiber 29 prior to making the connection with the second plug.

The module 10 fits in the tray 15 in a side-by-side array with a number of other modules. The base 16 of the tray is provided with means to define a fulcrum for the modules to permit the modules to be tilted. When tilted, the end walls 32 of the modules are raised to position the coupling 26 of the raised connector 11 in a position where it is convenient for a person to connect or disconnect a plug 12 to the projecting end 65 of the coupling. This tilting should be sufficient to raise the connector coupling 26 between one half the diameter of the connector plug and four times the diameter. Preferably, this height is between one and two times the diameter of the connector plug that has to be threaded into the coupling projection 65.

Figure 7:
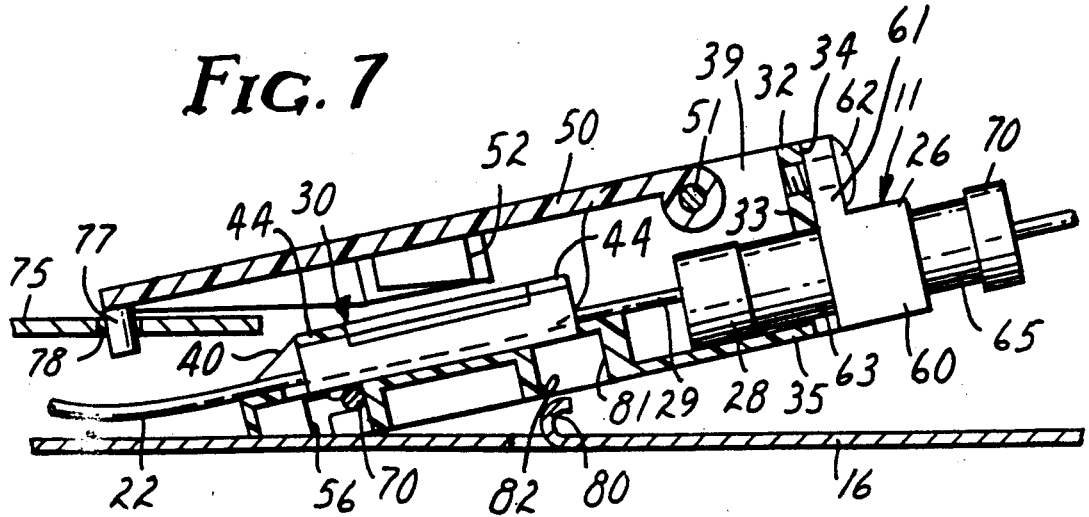
FIG. 7 is a longitudinal sectional view similar to that of FIG. 6 showing the module in the tilted or raised position to afford easy access to the connector.

In the illustrated embodiment the fulcrum is formed by a rod 70 extending transversely of the base 16 of the tray and spaced above and parallel to the surface of the base. The rod 70 is supported above the base 16 by ears 71 formed by bending strips upward from the base which strips are formed by making U-shaped cuts in the base to form the strips and to form rod receiving apertures in the strips. The notches 56 formed in the base 35 of the module are formed to secure the module onto the rod 70. The notches 56 thus have a portion extending the width of the base 35 and generally perpendicular to the plane of the base and an offset portion shaped to receive the rod 70, with the entrance to the offset area being at the end of the first portion and a boss at the mouth of the offset portion provides a narrowing of the entrance, forming means for resiliently receiving the rod and to capture the rod in the offset portion, as illustrated in FIGS. 6 and 7. The base of the module is provided with an inclined end portion 55 which initially permits some tilting of the base of the module intermediate its length and then defines stop means for limiting the tilting movement.

A plate 75, preferably formed of a transparent material is adapted to be positioned over the slack storage area at one end of the tray. This plate may be a hinged door or a sliding cover. This plate 75 is provided to protect the slack fiber from mishandling and extends to a position along the ends of the modules. The plate 75 can then conveniently provide means for retaining the raised modules 10 in the raised position. This is accomplished in the illustrated embodiment by the plate providing lip means to engage a further projection 77 on the underside of the cover 50 of the module 10 opposite the pivot. In the illustrated embodiment the lip means is defined by the edge of openings 78 formed along the edge of the plate 75 to receive the projection 77 and hold the module in the raised position, see FIG. 7. In the normal position of the plate and the modules 10, the plate 75 and the projections 77 of the covers 50 hold the covers 50 in a position with the projections 52 spaced from the cover of the splice 30.

Retaining clips 80 are formed from the base 16 of the tray 15 to position one beneath each module 10. The clip 80 is received in a recess 81 in the base 35 of the module 10 past a catch 82, to form a detent for holding the module in the normal operating position, see FIG. 6. This clip will frictionally engage the wall of a recess 81 and restrict the pivotal movement about the rod 70 and restrict lengthwise movement in relationship to the rod 70 when in the normal position.

The present invention thus provides a termination module for use in terminating optical fibers, which module can nest with other modules in a close-packed side-by-side array in a shallow tray, allowing individual modules in the array to be tilted to a position allowing ready access to the connectors thereon for connection or disconnection of distribution fibers. The module comprises an optical fiber plug and short pigtail fiber, a coupling, a splice for completing a splice between the pigtail fiber and a cable fiber readily, and a support for the coupling, plug and fiber and the splice.

Having described one embodiment of the module and distribution tray of the present invention, it will be appreciated that modifications can be made without departing from the scope or the spirit of the invention as defined in the appended claims.

We claim:

1. An optical fiber termination module for use in terminating a cabled optical fiber comprising:
    an optical fiber connector coupling and a single connector plug connected to one end of a length of optical fiber and joined to said coupling,
    an optical fiber splice having opposite open ends for making connection between a second end of said length of optical fiber and the free end of an optical fiber from a cable, and
    support means for supporting said coupling and said splice in juxtaposition, said support means comprising an end wall for supporting said coupling in fixed position thereon and a base extending in a direction away from said end wall, said base including magazine means for supporting said splice with said length of optical fiber extending in a straight line from said plug to said splice and said second end of said length of optical fiber being positioned in said splice, and means on said base for defining an axis transverse to said base for affording tilting movement of said base to move said end wall from a normal position to a raised position.

2. An optical fiber termination module according to claim 1 wherein said base is an elongate narrow strip integrally molded with said end wall.

3. An optical fiber termination module according to claim 2 wherein said end wall has an opening for receiving one end of said coupling and mounting means for affixing said coupling to said end wall.

4. An optical fiber termination module according to claim 2 wherein said magazine means comprises a cradle to receive said splice in axial alignment with said plug and said length of optical fiber.

5. An optical fiber termination module according to claim 1 wherein said base comprises an elongate narrow strip having a top surface supporting said magazine means and a bottom surface, said means defining said axis transverse to said base comprises wall means defining a notch in said bottom surface of said base extending transverse thereto and wherein a portion of said bottom surface on a side of said notch remote from said end wall is tapered toward said top surface affording pivotal movement of said base about said notch for moving said end wall and said coupling about said axis transverse to said base.

6. An optical fiber termination module according to claim 1 wherein said base comprises an elongate narrow strip having a top surface and a bottom surface, said means defining said axis transverse to said base comprises wall means defining a notch adjacent the end of said strip remote from said end wall for receiving a support defining a fulcrum about which said base may pivot to move said end wall about said 7. An optical fiber termination module according to claim 1 wherein said means defining said axis includes wall means defining a notch in said base spaced from said end wall for receiving a fulcrum about which said base may pivot and said base has a portion extending away from said notch opposite said end wall defining stop means for limiting said tilting movement to avoid bending a said cabled optical fiber excessively.

8. An optical fiber termination module according to claim 5 wherein said notch on the bottom surface of said base has an offset portion and means for capturing a rod in said offset portion for supporting said base for pivotal movement and restrict movement lengthwise in relationship to said base.

9. An optical fiber termination module according to claim 1 wherein said magazine means comprises a cradle for supporting said splice which has a shape to receive the splice and contact it about a majority of its perimeter and said cradle being sufficiently long to allow some axial movement of the splice upon making a connection therein.

10. An optical fiber termination module according to claim 1 wherein said end wall has an aperture therein for receiving said coupling, said coupling having an opening therethrough defining an axis which is located parallel to said base, said plug being received in said opening of said coupling at one end and said length of optical fiber extending straight and substantially in axial alignment therefrom to said magazine means and into said splice positioned in said magazine means, and said magazine means including means for directing an optical fiber from a said cable into said splice whereby it can abut against said second end of said length of optical fiber.

11. An optical fiber termination module according to claim 10 wherein said support means includes a cover mounted adjacent to said end wall, pivot means for affording pivotal movement of the cover about an axis transverse to said base for movement of said cover toward and away from said base to cover said plug and magazine means.

12. An optical fiber termination module according to claim 11 wherein said cover includes projection means for actuation of a splice in said magazine means upon movement thereof toward said base.

13. An optical fiber termination module according to claim 11 wherein said base is an elongate narrow strip having a top surface supporting said magazine means and a bottom surface, said bottom surface having means remote from said end wall affording pivotal movement of said base about an axis transverse to said base for moving said end wall and said coupling about said remote means and stop means for limiting said pivotal movement to restrict the bending of a said cabled optical fiber spliced to said length of optical fiber.

14. An optical fiber termination module according to claim 13 wherein said cover has one end connected to said pivot means and a second end, detent means adjacent said second end thereof engagable with lip means for holding said base in a position against said stop means.

15. A distribution panel for use in connecting optical fibers in a cable to connectors for distribution, said panel including a support plate, said support plate having a generally planar surface and support means for positioning a rod in spaced parallel relationship to said plate, a plurality of optical fiber termination modules positioned in a side-by-side array along said rod, each module comprising
   an optical fiber connector coupling and a single connector plug connected to one end of a length of optical fiber and joined to said coupling,
   an optical fiber splice having opposite open ends for making connection between a second end of said length of optical fiber and the free end of an optical fiber from a cable, and
   support means for supporting said coupling and said splice, said support means comprising an end wall for supporting said coupling in fixed position thereon, a base joined to said end wall and extending away from said end wall, said base including magazine means for supporting said splice with said second end of said length of optical fiber in said splice, and means affording tilting movement of said module about said rod and in relationship to other modules to position said end wall of said module in spaced relationship to the end wall of others of said modules.

16. A distribution panel according to claim 15 wherein said base is an elongate narrow strip integrally molded with said end wall.

17. A distribution panel according to claim 16 wherein said end wall has an opening for receiving one end of said coupling and mounting means for affixing said coupling to said end wall.

18. A distribution panel according to claim 15 wherein said base is an elongate narrow strip having a top surface supporting said magazine means and a bottom surface, said bottom surface having means remote from said end wall to receive said rod for pivotal movement of said base about said rod transverse to said base for moving said end wall and said coupling of individual modules about said rod to raise said end wall from said plate, and stop means for limiting said pivotal movement.

19. A distribution panel according to claim 18 wherein said means remote from said end wall and said stop means includes a recess in said bottom surface of said base and said stop means is formed by a portion of said bottom surface inclined toward said top surface and away from said recess and said end wall.

20. A distribution panel according to claim 19 wherein said each support means includes a cover mounted adjacent to said end wall, pivot means for affording pivotal movement of the cover about an axis transverse to said base for movement of said cover toward and away from said base to cover said plug and magazine means.

21. A distribution panel according to claim 15 wherein said connector coupling and said magazine are in rigid position to place said splice and plug with the length of fiber therebetween in substantially axial alignment.

22. A distribution panel according to claim 21 wherein said length of fiber extends straight from said plug to said splice.

23. A distribution panel according to claim 15 wherein said length of fiber is less than 12 inches in length and extends straight from said plug to said splice.

* * * * *